May 3, 1932. F. P. JACKSON 1,856,339
ADVERTISING ATTACHMENT FOR WEIGHING SCALES
Filed March 20, 1930 2 Sheets-Sheet 1
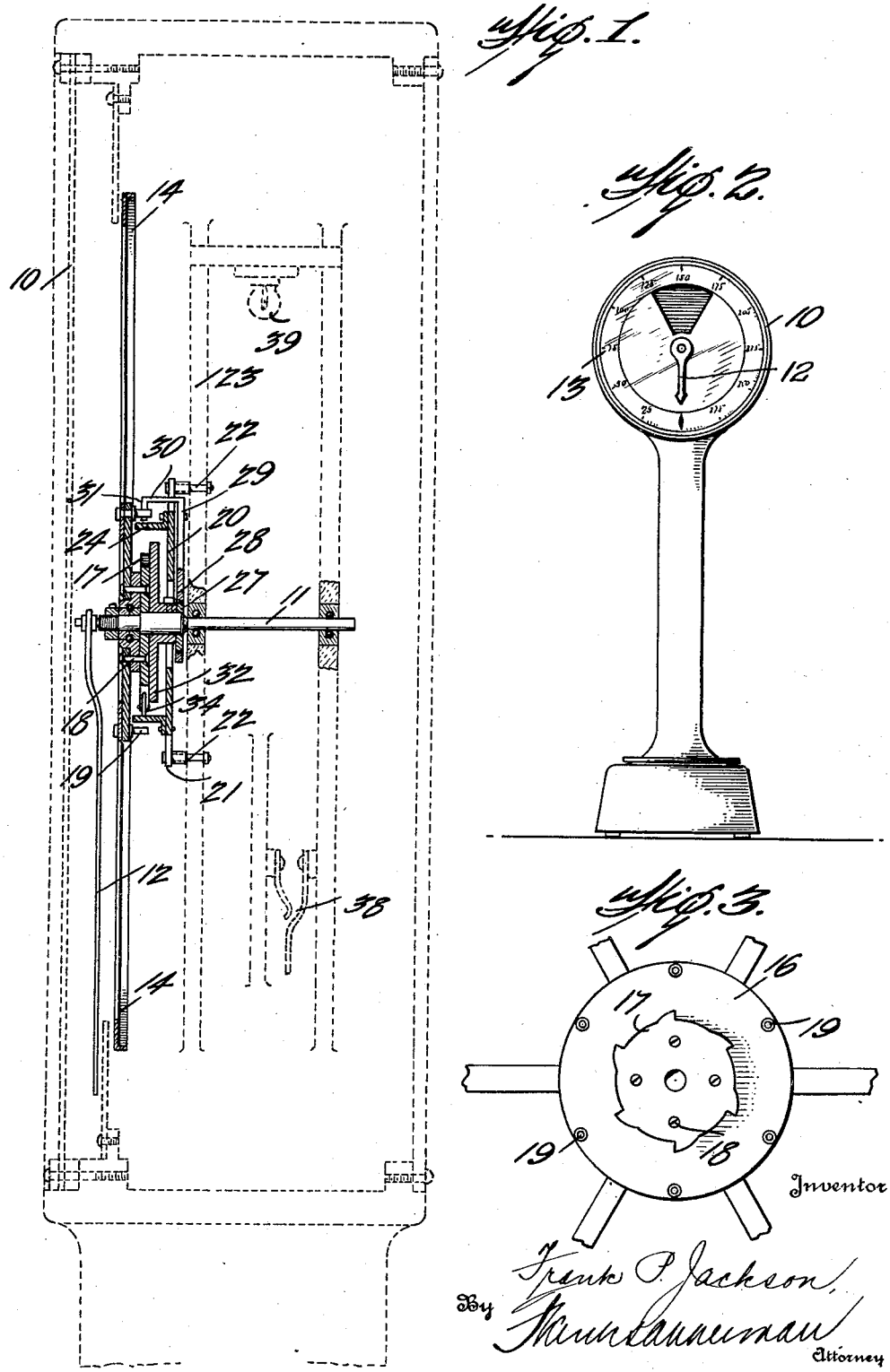

May 3, 1932. F. P. JACKSON 1,856,339
ADVERTISING ATTACHMENT FOR WEIGHING SCALES
Filed March 20, 1930 2 Sheets-Sheet 2
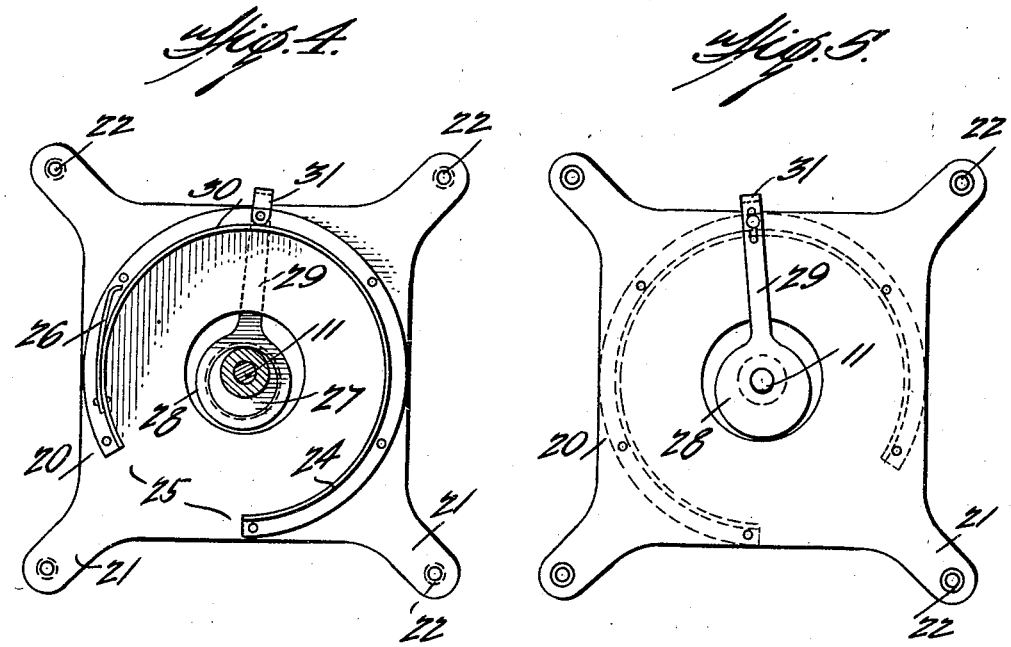
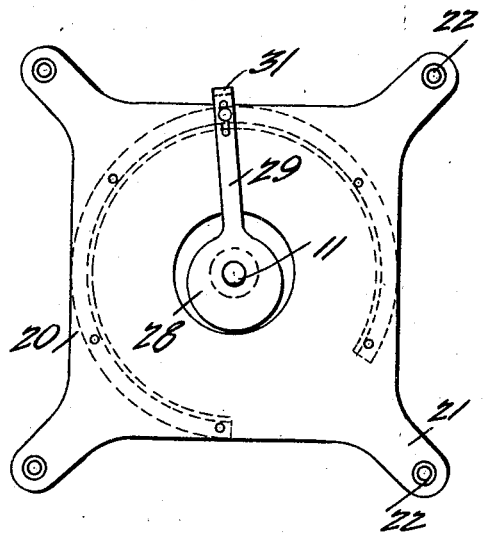
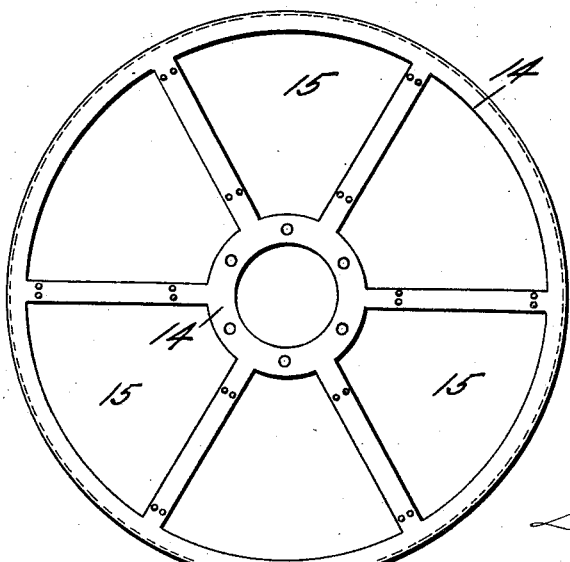
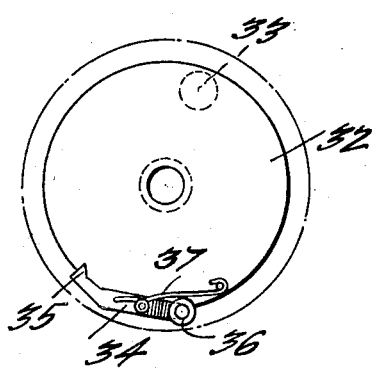

Patented May 3, 1932

1,856,339

UNITED STATES PATENT OFFICE

FRANK P. JACKSON, OF SAN ANTONIO, TEXAS

ADVERTISING ATTACHMENT FOR WEIGHING SCALES

Application filed March 20 1930. Serial No. 437,415.

This invention relates to an advertising device applied to weighing scales, and has for an object the provision of novel means whereby a sign carrying instrumentality is moved a predetermined distance during each weighing operation; and it is the purpose of the inventor to provide a sign carrying member on which a plurality of signs is mounted or secured in order that said signs may be brought into registry with an opening in the scale in front of the person being weighed each time a person is weighed. By the means just indicated, when the person mounts the scale, a sign will be displayed in substantially his line of vision and, as the weighing mechanism operates, a sign carrying member will be actuated in order that the sign first displayed will be moved and another sign caused to replace it in the line of vision of the user of the scale. Each time, therefore, a person occupies the scale, two signs will be successively displayed, one being in view at the time the scale is mounted or occupied by the person and another being displayed during the weighing operation, which latter remains displayed until the succeeding operation of the scale.

It is a further object of this invention to provide novel means whereby the sign moving instrumentality will be automatically actuated or operated as the weighing mechanism is operating, due to the weight of the occupant of the scale, thus making it possible to install the mechanism in scales which are now in use or in new manufactures.

It is furthermore an object of this invention to produce mechanism which is positive in its operation and comparatively inexpensive to manufacture and install.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a sectional view of the sign displaying mechanism;

Figure 2 illustrates a conventional type of weighing scale with which the invention may be used;

Figure 3 illustrates a face view of a fragment of the sign carrier and parts associated with it;

Figure 4 illustrates a view in elevation of part of the mechanism;

Figure 5 illustrates a view in elevation of the reverse side of the mechanism shown in Fig. 4;

Figure 6 illustrates a detail view of the sign carrier;

Figure 7 illustrates a face view of part of the actuating mechanism of the sign carrier; and Figure 8 illustrates a plan view of the ratchet and its spring.

In the present embodiment of the invention, a weighing scale may have a window or opening 10 where the sign is to be displayed. No particular type of weighing scale is described, but Figure 2 is a conventional showing of a form adapted for use when the invention is applied.

Usually the conventional types of scales have suitably actuated shafts 11 which are partially rotated when the weighing mechanism is operated and the shaft, in this instance, is provided with a hand or pointer 12 which is intended to move with relation to the graduations 13.

An advertising carrying member 14 may be provided with a plurality of segments, such as 15, to be occupied by advertising cards or displays, and it is the purpose of the inventor that this member shall be provided with a disk 16 on its face having a ratchet wheel 17, the said ratchet wheel being secured in place by suitable fastenings 18, such as screws, or the like. The disk is also provided with a plurality of pins 19, for a purpose to be presently explained and, in the present embodiment of the invention, these pins extend inwardly from the inner face of the disk. The advertising device is rotatively mounted on the shaft in any appropriate way.

An apertured plate 20 has apertured arms 21 and the said arms are mounted on studs 22 which are suitably anchored on the scale structure or frame, conventionally shown and identified by the numeral 23. These studs, of course, may be anchored to any appropriate scale structure in such relation to an indicator shaft as to permit the plate, such as 20, to occupy substantially the position in which it is shown in Figure 1 with the shaft extending through the said plate.

A curved flange or track 24, in the present embodiment of the invention, extends outwardly from the plate 20 and the ends of the said flange are spaced apart to produce a clearance, as at 25. The flange has a leaf spring 26 secured to it near one of its ends and the free end of the spring is in spaced relation to the outer surface of the flange and it extends around the flange in the direction of travel of the pins 19 as they move around with the sign carrier, it being shown in the drawings that these pins are concentric with the outer surface of the flange.

An eccentric 27 is carried by the shaft 11 and an eccentric strap 28 provided with an arm 29 operates thereon, the said arm extending radially of the plate 20 and beyond its periphery where it is shaped to extend forwardly beyond the periphery, as at 30, and it terminates in a depending portion 31 which is intended to intermittently occupy a position in the path of travel of the pins 19.

The relation of parts is such that when the shaft 11 is rotated or partially rotated, the eccentric will cause the arm to move radially in order that the depending portion 31 will be carried out of engagement with a pin or out of the path of travel thereof, so that when the sign carrier is partially rotated, a pin will be carried past the depending portion; and the arrangement of parts is furthermore such that when a pin has passed the depending portion, the said arm will be moved in the opposite direction in order that the said depending portion will be in the path of travel of the next succeeding pin. By this arrangement, the sign carrying member is intermittently released and arrested. For convenience in description, the member 31 has been referred to as a depending portion, but, obviously, the position of the arm could be changed so that the so-called depending portion would not extend downwardly, but might extend horizontally, or at other angles, with relation to the other parts of the mechanism.

A disk 32 is also secured on the shaft 11 and it is provided with a balance weight 33 on one side of the shaft and a pivotally mounted ratchet 34 on the opposite side of the shaft. The ratchet has an end 35 which is intended to successively engage the teeth of the ratchet wheel 17, as will presently appear, whereas a wheel 36 is mounted on the opposite end thereof, the said wheel being adapted to ride on the inner surface of the flange 24 as the disk 32 is carried with the shaft 11. When in such position, the ratchet is out of engagement with the ratchet wheel, but when the wheel 36 of the ratchet passes one end of the said flange and is moving in the space identified by the numeral 25, a spring 37 which actuates the ratchet is operative to force the ratchet inwardly so that the ratchet is moved into engagement with one of the teeth of the ratchet wheel. When the ratchet is moved when in engagement with a tooth, it turns the said ratchet wheel and the sign carrier the distance of one tooth. The parts are so timed and arranged that the pin of the sign carrier is released in order that the sign carrier may be free to move at the time the ratchet engages the tooth and imparts movement to the sign carrier.

During the rotation of the sign carrier, the pins 19 will successively ride over the spring 26 and press it toward the flange, but when the pin has passed the end of the spring, it will move outwardly to the position shown in Figure 4 and act as an abutment or stop to prevent retrograde movement of the sign carrier.

From an inspection of the drawings and from the foregoing description, it will be apparent that as the shaft 11 is partially rotated, the arm 29 will be moved so that its end 31 moves out of the path of travel of a pin 19, but before this occurs, the first sign will be visible through the window of the scale. When the sign carrier is released, further rotation of the shaft 11 causes the disk 32 to move the ratchet around the flange, at which time the ratchet engages a ratchet tooth and rotates the sign carrier one step or tooth. The pins 19 correspond in number to those of the ratchet teeth and hence the sign carrier is intermittently released, actuated and arrested as the weighing operations occur.

There is illustrated in the drawings a conventional type of electric switch 38 and it is the purpose of the inventor that when weight is applied to the platform of the scale, a part carrying one of the switch elements is caused to move vertically in order that the switch elements may be caused to contact and this is intended to supply current to light a lamp 39 located back of the window where the sign is to be displayed, but, obviously, these parts may be changed to suit particular requirements.

I claim:

1. In combination with a rotative shaft of weighing scales, a sign carrier rotatively mounted on the shaft, means for imparting the rotary motion of the shaft to the sign carrier whereby it is moved with the shaft in one direction, and means for intermittently arresting and releasing the said sign carrier.

2. In combination with a rotative shaft of weighing scales, a sign carrier rotatively mounted thereon, a ratchet wheel secured to the sign carrier, a disk rotative with the shaft, a ratchet carried by the disk, and means for causing the said ratchet to intermittently engage the teeth of the ratchet wheel.

3. In combination with a rotative shaft of weighing scales, a sign carrier rotatively mounted thereon, a ratchet wheel secured to the sign carrier, a disk rotative with the shaft, a ratchet carried by the disk, means for causing the said ratchet to intermittently engage the teeth of the ratchet wheel, and means for intermittently releasing and arresting the said sign carrier.

4. In combination with a rotative shaft of weighing scales, a sign carrier rotatively mounted thereon, a ratchet wheel secured to the sign carrier, a disk rotative with the shaft, a ratchet carried by the disk, means for causing the said ratchet to intermittently engage the teeth of the ratchet wheel, an eccentric carried by the shaft, an arm reciprocated by said eccentric, and means on the arm cooperating with a part of the sign carrier for intermittently releasing and arresting the sign carrier.

5. In combination with a rotative shaft of weighing scales, a sign carrier rotatively mounted thereon, a ratchet wheel secured to the sign carrier, a disk rotative with the shaft, a ratchet pivoted on the said disk, an interrupted flange partially encompassing the disk and ratchet, a member on the ratchet adapted to ride on the flange whereby the ratchet is held out of engagement with the ratchet tooth, and means whereby the ratchet is moved into engagement with the ratchet tooth when the member riding on the flange reaches the interrupted portion of the said flange.

6. In combination with a rotative shaft of weighing scales, a sign carrier rotatively mounted thereon, a scale face having a window in which the signs of the carrier are successively displayed, a ratchet wheel secured to the sign carrier, a disk rotative with the shaft, a ratchet carried by the disk, means for causing the said ratchet to intermittently engage the teeth of the ratchet wheel, an eccentric carried by the shaft, an arm reciprocated by said eccentric, and means on the arm cooperating with a part of the sign carrier for intermittently releasing and arresting the sign carrier.

7. In combination with a rotative shaft of weighing scales, a sign carrier rotatively mounted thereon, a scale face having a window in which the signs of the carrier are successively displayed, a ratchet wheel secured to the sign carrier, a disk rotative with the shaft, a ratchet pivoted on the said disk, an interrupted flange partially encompassing the disk and ratchet, a member on the ratchet adapted to ride on the flange whereby the ratchet is held out of engagement with the ratchet tooth, and means whereby the ratchet is moved into engagement with the ratchet tooth when the member riding on the flange reaches the interrupted portion of the said flange.

8. In combination with a rotative shaft of weighing scales, a sign carrier rotative on the shaft and having a plurality of segments, signs applied to said segments, a ratchet wheel connected to the sign carrier, pins on the said sign carrier, an arm having means for engaging the pins, means for moving said pin engaging means into and out of the path of travel of the pins, said means including an eccentric on the rotative shaft and means on the arm associated with the eccentric, a plate stationary with relation to the shaft and through which the shaft extends, a curved flange carried by the plate having its ends in spaced relation to each other, a disk rotative with the shaft, a ratchet pivoted on the disk, a wheel on one end of the ratchet adapted to engage and ride on the flange for holding the ratchet out of engagement with a ratchet tooth, and means for causing the engagement of the ratchet and a tooth when the wheel has passed the end of the flange.

9. In combination with a rotative shaft of weighing scales, a sign carrier rotative on the shaft and having a plurality of segments, signs applied to said segments, a ratchet wheel connected to the sign carrier, pins on the said sign carrier, an arm having means for engaging the pins, means for moving said pin engaging means into and out of the path of travel of the pins, said means including an eccentric on the rotative shaft and means on the arm associated with the eccentric, a plate stationary with relation to the shaft and through which the shaft extends, a curved flange carried by the plate having its ends in spaced relation to each other, a disk rotative with the shaft, a ratchet pivoted on the disk, a wheel on one end of the ratchet adapted to engage and ride on the flange for holding the ratchet out of engagement with a ratchet tooth, means for causing the engagement of the ratchet and a tooth when the wheel has passed the end of the flange, and suitable means for illuminating the signs.

FRANK P. JACKSON.